(12) United States Patent
Ladavac et al.

(10) Patent No.: US 12,248,226 B2
(45) Date of Patent: *Mar. 11, 2025

(54) DRIVING METHODS FOR A VARIABLE LIGHT TRANSMISSION DEVICE

(71) Applicant: E INK CORPORATION, Billerica, MA (US)

(72) Inventors: Kosta Ladavac, Somerville, MA (US); Richard J. Paolini, Jr., Framingham, MA (US); Stephen J. Telfer, Arlington, MA (US); Lee Yezek, Watertown, MA (US); Sunil Krishna Sainis, Melrose, MA (US); Peter Carsten Bailey Widger, Nashua, NH (US)

(73) Assignee: E Ink Corporation, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/097,819

(22) Filed: Jan. 17, 2023

(65) Prior Publication Data

US 2023/0152659 A1 May 18, 2023

Related U.S. Application Data

(63) Continuation of application No. 16/862,910, filed on Apr. 30, 2020, now Pat. No. 11,579,510.

(Continued)

(51) Int. Cl.
*G02F 1/1685* (2019.01)
*G02F 1/167* (2019.01)
*G02F 1/1676* (2019.01)

(52) U.S. Cl.
CPC ............ *G02F 1/1685* (2019.01); *G02F 1/167* (2013.01); *G02F 1/1676* (2019.01)

(58) Field of Classification Search
CPC ....... G09G 3/344; G02F 1/1685; G02F 1/167; G02F 1/1676; G02F 1/16757; G02F 1/1347

See application file for complete search history.

(56) References Cited

U.S. PATENT DOCUMENTS 4,041,481 A * 8/1977 Sato ....................... G09G 3/344
359/245
4,418,346 A 11/1983 Batchelder
(Continued)

FOREIGN PATENT DOCUMENTS

| EP | 1462847 A1 | 9/2004 |
| KR | 20100135442 A | 12/2010 |
| WO | 2004079442 A1 | 9/2004 |

OTHER PUBLICATIONS

Kitamura, T. et al., "Electrical toner movement for electronic paper-like display", Asia Display/IDW '01, pp. 1517-1520, Paper HCS1-1 (2001).

(Continued)

*Primary Examiner* — Jeff Piziali
(74) *Attorney, Agent, or Firm* — Ioannis Constantinides

(57) ABSTRACT

A variable light transmission device has at least one layer of electrophoretic medium comprising charged particles. Application of a an electric field having a waveform formed by a superposition of a carrier and a modulator waveform enables the switching of the device from a closed state to an open state, wherein the open state has higher light transmission than the closed state. As a result, the device enables the selection of the desired optical state by the user.

12 Claims, 2 Drawing Sheets

Related U.S. Application Data

(60) Provisional application No. 62/844,205, filed on May 7, 2019.

(56) References Cited

U.S. PATENT DOCUMENTS

| | | | |
|---|---|---|---|
| 5,872,552 A | 2/1999 | Gordon, II et al. |
| 6,130,774 A | 10/2000 | Albert et al. |
| 6,144,361 A | 11/2000 | Gordon, II et al. |
| 6,172,798 B1 | 1/2001 | Albert et al. |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,672,921 B1 | 1/2004 | Liang et al. |
| 6,788,449 B2 | 9/2004 | Liang et al. |
| 6,866,760 B2 | 3/2005 | Paolini, Jr. et al. |
| 6,922,276 B2 | 7/2005 | Zhang et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,116,466 B2 | 10/2006 | Whitesides et al. |
| 7,144,942 B2 | 12/2006 | Zang et al. |
| 7,170,670 B2 | 1/2007 | Webber |
| 7,230,751 B2* | 6/2007 | Whitesides ............ G02F 1/1671 345/107 |
| 7,236,291 B2 | 6/2007 | Kaga et al. |
| 7,312,784 B2 | 12/2007 | Baucom et al. |
| 7,321,459 B2 | 1/2008 | Masuda et al. |
| 7,327,511 B2 | 2/2008 | Whitesides et al. |
| 7,369,299 B2 | 5/2008 | Sakurai et al. |
| 7,411,719 B2 | 8/2008 | Paolini, Jr. et al. |
| 7,453,445 B2 | 11/2008 | Amundson |
| 7,474,295 B2* | 1/2009 | Matsuda .................. G09F 9/372 345/169 |
| 7,495,819 B2 | 2/2009 | Sakurai et al. |
| 7,525,719 B2 | 4/2009 | Yakushiji et al. |
| 7,535,624 B2 | 5/2009 | Amundson et al. |
| 7,646,358 B2 | 1/2010 | Hattori et al. |
| 7,646,530 B2 | 1/2010 | Takagi et al. |
| 7,679,814 B2 | 3/2010 | Paolini, Jr. et al. |
| 7,715,088 B2 | 5/2010 | Liang et al. |
| 7,839,564 B2 | 11/2010 | Whitesides et al. |
| 7,999,787 B2 | 8/2011 | Amundson et al. |
| 8,009,348 B2 | 8/2011 | Zehner et al. |
| 8,531,389 B2 | 9/2013 | Johnson et al. |
| 8,878,769 B2 | 11/2014 | Miyashita |
| 9,279,906 B2 | 3/2016 | Kang |
| 9,341,916 B2 | 5/2016 | Telfer et al. |
| 9,812,073 B2 | 11/2017 | Lin et al. |
| 10,444,553 B2 | 10/2019 | Laxton |
| 11,250,794 B2 | 2/2022 | Harris et al. |
| 11,579,510 B2* | 2/2023 | Ladavac ................ G02F 1/167 |
| 2006/0038772 A1* | 2/2006 | Amundson ............ G02F 1/167 345/107 |
| 2006/0087479 A1 | 4/2006 | Sakurai et al. |
| 2006/0087489 A1 | 4/2006 | Sakurai et al. |
| 2006/0209008 A1 | 9/2006 | Nihei et al. |
| 2006/0214906 A1 | 9/2006 | Kobayashi et al. |
| 2008/0136774 A1 | 6/2008 | Harris et al. |
| 2008/0158142 A1 | 7/2008 | Zhou et al. |
| 2010/0302622 A1 | 12/2010 | Hosoya et al. |
| 2011/0012889 A1 | 1/2011 | Miyamoto |
| 2011/0199671 A1 | 8/2011 | Amundson et al. |
| 2015/0005720 A1 | 1/2015 | Zang et al. |
| 2016/0012710 A1 | 1/2016 | Lu et al. |
| 2017/0351155 A1 | 12/2017 | Paolini, Jr. et al. |
| 2021/0116773 A1* | 4/2021 | Yoon ....................... G02F 1/167 |

OTHER PUBLICATIONS

Yamaguchi, Y. et al., "Toner display using insulative particles charged triboelectrically", Asia Display/IDW '01, pp. 1729-1730, Paper AMD4-4 (2001).

Squires, Todd M. et al., "Induced-Charge Electro-Osmosis". J. Fluid Mech., vol. 509, pp. 217-252; (2004).

Korean Intellectual Property Office, PCT/US2020/030636, International Search Report and Written Opinion, Aug. 13, 2020.

European Patent Office, "Extended European Search Report", EP Appl. No. 20802291.3, Jan. 2, 2023.

\* cited by examiner

DRIVING METHODS FOR A VARIABLE LIGHT TRANSMISSION DEVICE

CROSS-REFERENCE TO RELATED APPLICATIONS

This application is a continuation of U.S. Patent Application having Ser. No. 16/862,910, filed on Apr. 30, 2020, published on Nov. 12, 2020 as US 2020/0355979 A1, which claims the benefit of U.S. Provisional Application No. 62/844,205, filed on May 7, 2019, the contents of which are incorporated herein by reference in their entirety.

BACKGROUND OF THE INVENTION

This invention relates to a method of operating a variable light transmission device. Specifically, the invention relates to a driving method for switching particle-based electro-optic devices between optical states using electrical fields. Variable light transmission devices can modulate light and can be used on mirrors, windows and similar items. They can modulate the amount of light or other electromagnetic radiation passing therethrough. For example, as mentioned below, the present invention may be applied to provide windows that can modulate infrared radiation for controlling temperatures within buildings. Specifically, this invention relates to variable light transmission devices that use particle-based electrophoretic media to control light modulation. Examples of electrophoretic media that may be incorporated into various embodiments of the present invention include, for example, the electrophoretic media described in U.S. Pat. Nos. 7,116,466 and 7,327,511, U.S. Patent Application Publication Nos 2014/0055841, No 2017/0351155, US2011/0199671 and U.S. Patent Application having Ser. No. 62/784,897 (filed on Dec. 26, 2019), the contents of which are incorporated by reference herein in their entireties.

Particle-based electrophoretic displays, in which a plurality of charged particles move through a suspending fluid under the influence of an electric field, have been the subject of intense research and development for a number of years. Such displays can have attributes of good brightness and contrast, wide viewing angles, state bistability, and low power consumption when compared with liquid crystal displays.

The terms "bistable" and "bistability" are used herein in their conventional meaning in the art to refer to displays comprising display elements having first and second display states differing in at least one optical property, and such that after any given element has been driven by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. Patent Application Ser. No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

As noted above, electrophoretic media require the presence of a suspending fluid. In most prior art electrophoretic media, this suspending fluid is a liquid, but electrophoretic media can be produced using gaseous suspending fluids. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT), E Ink Corporation, E Ink California, LLC and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Microcell structures, wall materials, and methods of forming microcells; see for example U.S. Pat. Nos. 7,072,095 and 9,279,906;
(d) Methods for filling and sealing microcells; see for example U.S. Pat. Nos. 7,144,942 and 7,715,088;
(e) Films and sub-assemblies containing electro-optic materials; see for example U.S. Pat. Nos. 6,982,178 and 7,839,564;
(f) Backplanes, adhesive layers and other auxiliary layers and methods used in displays; see for example U.S. Pat. Nos. 7,116,318 and 7,535,624;
(g) Color formation and color adjustment; see for example U.S. Pat. Nos. 7,075,502 and 7,839,564;
(h) Methods for driving displays; see for example U.S. Pat. Nos. 7,012,600 and 7,453,445;
(i) Applications of displays; see for example U.S. Pat. Nos. 7,312,784 and 8,009,348; and
(j) Non-electrophoretic displays, as described in U.S. Pat. No. 6,241,921 and U.S. Patent Applications Publication No. 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published U.S. application Ser. No. 2002/0075556, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated or microcell electrophoretic display typically does not suffer from the clustering and settling failure mode of traditional electrophoretic devices and provides further advantages, such as the ability to print or coat the display on a wide variety of flexible and rigid substrates. Use of the word "printing" is intended to include all forms of printing and coating, including, but without limitation: premetered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition; and other similar techniques. Thus, the resulting display can be flexible. Further, because the display medium can be printed (using a variety of methods), the display itself can be made inexpensively.

One potentially important market for electrophoretic media is windows with variable light transmission. As the energy performance of buildings and vehicles becomes increasingly important, electrophoretic media could be used as coatings on windows to enable the proportion of incident radiation transmitted through the windows to be electronically controlled by varying the optical state of the electrophoretic media. Effective implementation of such "variable-transmissivity" ("VT") technology in buildings is expected to provide (1) reduction of unwanted heating effects during hot weather, thus reducing the amount of energy needed for cooling, the size of air conditioning plants, and peak electricity demand; (2) increased use of natural daylight, thus reducing energy used for lighting and peak electricity demand; and (3) increased occupant comfort by increasing both thermal and visual comfort. Even greater benefits would be expected to accrue in an automobile, where the ratio of glazed surface to enclosed volume is significantly larger than in a typical building. Specifically, effective implementation of VT technology in automobiles is expected to provide not only the aforementioned benefits but also (1) increased motoring safety, (2) reduced glare, (3) enhanced mirror performance (by using an electro-optic coating on the mirror), and (4) increased ability to use heads-up displays. Other potential applications include of VT technology include privacy glass and glare-guards in electronic devices.

The present invention relates to a method of operating a variable light transmission device having particle-based electrophoretic media.

SUMMARY OF THE INVENTION

In one aspect, the various embodiments of the present invention provide a method of operating a variable light transmission device using a waveform applied at an initial optical state of the device to drive the device to a final optical state, wherein the device has a higher percent transmission at the final optical state than at the initial optical state. The variable light transmission device comprises at least one electrophoretic medium layer comprising charged particles, wherein the electrophoretic medium layer is disposed between two electrodes. The method comprises the step of applying an electric field across the electrophoretic medium layer that causes movement of the charged particles, resulting in the variable light transmission device switching from an initial optical state to a final optical state, wherein the final optical state has higher percent light transmission than the initial optical state. The waveform of the applied electric field is a superposition of a carrier waveform and a modulator waveform. The carrier waveform has amplitude $V_1$ and frequency $\omega_1$, and the modulator waveform has initial amplitude $V_2$ and frequency $\omega_2$, wherein $V_1$ is of from about 30 V to about 180 V, $\omega_1$ of from about 50 Hz to about 1000 Hz, and $V_2$ is of from about 3 V to about 60 V, $\omega_2$ is from about 0.1 Hz to about 10 Hz. $V_1$ is greater than $V_2$ and $\omega_1$ is greater than $\omega_2$. The amplitude of the modulator waveform is variable and is reduced from an initial amplitude value at the time of the start of the application of the waveform to the variable light transmission device to a final amplitude value at the completion of the application of the of the waveform to the variable light transmission device. The final amplitude value of the modulator waveform may be 0 V. The final amplitude value of the modulator waveform may be may also be higher than zero V and from about 0.1 V to about 3 V.

In another aspect, the waveform type of the applied electric field to the variable light transmission device is selected from the group consisting of a square, a sinusoidal, a trigonal, and a sawtooth type.

In another aspect, the total driving time of the application of the waveform is from about 1 s to about 100 s. The reduction of amplitude value of the modulator waveform from the initial amplitude value to the final amplitude value may be performed in 2 or more sequential steps, 5 or more steps, 10 or more steps, 100 or more steps, and 200 or more steps.

DETAILED DESCRIPTION OF THE INVENTION

Herein, the terms "final optical state", "open state" and light-transmissive state are used interchangeably and represent the state wherein the film has higher light transmittance. The terms "initial optical state", "closed state" and non-light-transmissive are used interchangeably and represent the state wherein the film has lower light transmittance than the open state.

For convenience, the term "light" is normally be used herein, but this term should be understood in a broad sense to include electromagnetic radiation at non-visible wavelengths.

Figure 2A:
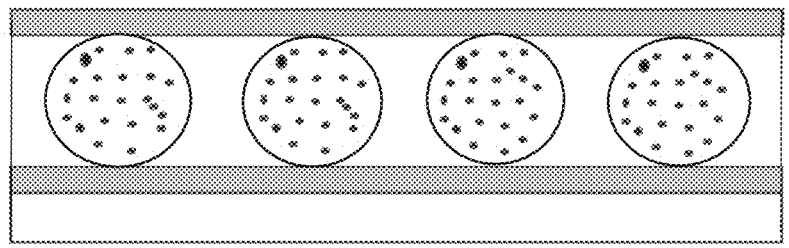
FIG. 2A is a schematic illustration of a variable light transmission device at the initial optical state (closed state).
Figure 2B:
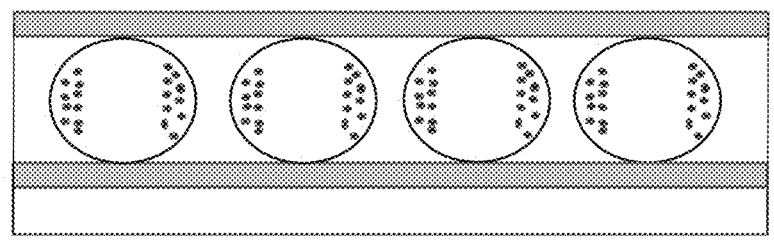
FIG. 2B is a schematic illustration of a variable light transmission device at the final optical state (open state).

In the variable light transmission device of the present invention, the transparent state (final optical state or open state) is brought about by field dependent aggregation of the electrophoretic particles; such field dependent aggregation may take the form of movement of electrophoretic particles to the lateral walls of a droplet (whether that droplet is present in a polymer-dispersed medium, or within a capsule or microcell), or "chaining", i.e. formation of strands of electrophoretic particles within the droplet, or possibly in other ways. Regardless of the exact type of aggregation achieved, such field dependent aggregation of the electrophoretic particles causes the particles to occupy only a small proportion of the viewable area of each droplet, as seen in a direction looking perpendicular to the viewing surface through which an observer views the electrophoretic medium. Thus, in the light-transmissive state (or final optical state or open state), the major part of the viewable area of each droplet is free from electrophoretic particles and light can pass therethrough. In the case of movement of electrophoretic particles from the closed state (or initial optical state), where the electrophoretic particles are dispersed relatively uniformly across the viewing area of each droplet (see FIG. 2A), to the open state or final optical state (see FIG. 2B), where the particles are aggregated to the lateral walls of a droplet via the application of electric field, the phenomenon of induced charge electro-osmosis (ICEO) is likely involved. The phenomenon has been described in the art (see article by Squires and Bazant, "Induced-charge electro-osmosis" J. Fluid Mech. 2004, 509, 217-252).

In the closed state, the relatively uniform distribution of the particles across the viewing area of the droplets of the electrophoretic device (FIG. 2A) obstructs the transmission of light through the device. On the contrary, the aggregation of the electrophoretic particles near the lateral wall of the droplets of the electrophoretic device (FIG. 2B), allows more light to pass through the device.

ICEO is a second-order phenomenon that occurs when a polarizable particle experiences an electric field in the presence of an electrolyte. The induced particle motion depends upon the square of the applied voltage, but does not depend upon the polarity of the applied field, and therefore can be driven by AC fields. In this case the particle velocity is inversely dependent on the AC frequency. ICEO-mediated organization of the particles, and hence the formation of an open state, is promoted by application of relatively high frequency AC fields (typically at least 50 Hz) to the electrophoretic medium, and by the use of high voltages (typically at least about 30V). Conversely, dispersion of the electrophoretic particles into the suspending fluid, leading to the formation of a closed state, is promoted by application of low frequency fields (typically less than 50 Hz) to the electrophoretic medium. This state may be produced by normal electrophoretic particle switching or by ICEO-induced flow at these low frequencies. Normal electrophoretic particle switching does not require high voltage. Typically, voltages in the range of 5-20V are adequate.

In other words, to favor the open state of the device, it is advantageous to vary both the operating voltage and the waveform, using a high frequency, high voltage waveform. On the contrary, low frequency and low voltage waveform favors the close state. These changes in waveform can be coupled with either patterned electrodes or various conductive particle materials, such as doped, metallic or semiconductive materials, like those described in U.S. Pat. No. 7,327,511, to optimize the response in both directions.

An additional concern for variable light transmission devices comprising capsules is grain. In this application, "grain" refers to visual non-uniformities caused by several factors, such as clusters of colored binder or clumps/layers of capsules, capsule packing variability, voids, thickness variations, and coating defects including pinholes. These non-uniformities reduce visibility when a user looks through the device in the open state. The term "grain" originates in film photography, where early silver films were known to have clumps of silver that made a developed picture appear "grainy."

Variable light transmission devices comprising microcapsules consist of microscopic areas that have differences in coat weight and degree of multi-layering. If these devices are driven to their darkest states, the differences in coat weight and packing can be viewed by a user as grain. One method for reducing the amount of grain in an encapsulated electrophoretic medium is by applying a driving method according to the various embodiments of the present invention.

According to one embodiment of the present invention, grain can be appreciably improved for a variable light transmission device containing encapsulated electrophoretic media by utilizing a driving method comprising applying a waveform to the device having an initial optical state until the film switches to a final optical state, the initial state having a lower percent transmission than the final state.

As mentioned above, the electrophoretic medium layer is capable of displaying open state and a close state, wherein the selection of the optical state is driven by the electric field applied to the electrodes. The waveform of the electric field applied on the device at the initial optical state of the film to drive the final optical state is a superposition of two simpler waveforms (a) a carrier waveform and (b) a modulator waveform, wherein the modulator waveform has an initial amplitude that is reduced over the time period of the application of the waveform on the variable light transmission device. Thus, the term "initial amplitude" of the modulator waveform are used throughout this disclosure to indicate that the value is the amplitude at the time of the initial application of the waveform to the variable light transmission device. The more general term "amplitude" of the modulator waveform is also used that may include all the amplitude values of the applied modulator waveform, and not only the initial amplitude value. The term final amplitude of the modulator waveform are used to indicate the amplitude of the modulator waveform at the time in which the application of the waveform to the variable light transmission device to bring the device to its open state is terminated.

Herein, the amplitude of the carrier waveform is represented by $V_1$ and it is expressed in volts (V). The frequency of the carrier waveform is represented by $\omega_1$ and it is expressed in Hertz (Hz). The initial amplitude of the modulator waveform is represented by $V_2$ and it is expressed in volts (V). The frequency of the modulator waveform is represented by $\omega_2$ and it is expressed in Hertz (Hz). The total driving time of the application of the driving waveform to switch the variable light transmission device is represented by $t_{total}$ and it is expressed in seconds (s).

Figure 1:
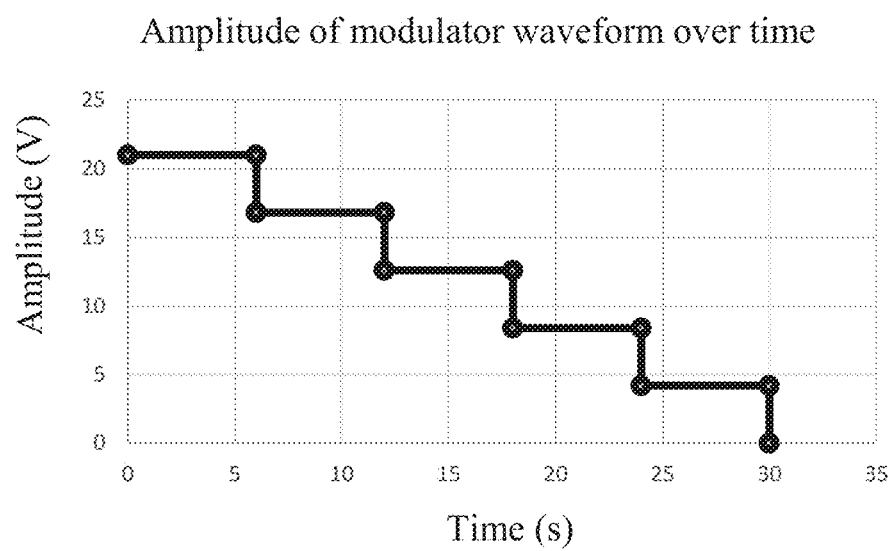
FIG. 1 is an example of a graph of a linear stepwise reduction of an amplitude of the modulator waveform over time in 5 steps (from 21 V to 0 V over 30 s).

The waveform applied at the initial optical state of the device to drive the final optical state can be expressed by one of the Equations 1-4, which are provided below. These equations correspond to a decrease in the amplitude of the modulator waveform over time in a linear manner from the maximum initial amplitude value to a final amplitude value. In this embodiment, the final amplitude valued is reached at the time when the waveform application on the variable light transmission device is terminated and the device is in in its open state. Equations 1 corresponds to a square waveform, Equation 2 correspond to sinusoidal waveform, Equation 3 corresponds to trigonal waveform, and Equation 4 corresponds to sawtooth waveforms. Other types of waveforms can be also applied. The term "linear" as used herein to describe reduction of the amplitude of the modulator waveform over time includes any reduction over time in a stepwise (digitized) manner. As an illustration, FIG. 1 provides an example of a linear stepwise amplitude reduction over time in 5 steps.

$$V_1 \frac{\sin(\omega_1 t)}{|\sin(\omega_1 t)|} + V_2 \frac{t_{total} - t}{t_{total}} \frac{\sin(\omega_2 t)}{|\sin(\omega_2 \tau)|} \quad \text{Equation 1}$$

$$V_1[\sin(\omega_1 t)] + V_2 \frac{t_{total} - t}{t_{total}} \sin(\omega_1 t) \quad \text{Equation 2}$$

$$V_1 \frac{2\omega_1}{\pi}\sin^{-1}(\sin(2\pi t)) + V_2 \frac{t_{total} - t}{t_{total}} \frac{2\omega_2}{\pi}\sin^{-1}(\sin(2\pi t)) \quad \text{Equation 3}$$

$$V_1\left[\frac{t}{\omega_1} - \text{floor}\left(\frac{t}{\omega_1}\right)\right] + V_2 \frac{t_{total} - t}{t_{total}}\left[\frac{t}{\omega_2} - \text{floor}\left(\frac{t}{\omega_2}\right)\right] \quad \text{Equation 4}$$

The Equations 1-4 indicate that the waveforms are the result of superposition of the carrier AC waveform, represented by the first factor of the equations and the modulator AC waveform, represented by the second factor of the equations. The term t in the equations is the time passed from the initial application of the waveform, expressed in seconds (s). The expressions $|\sin(\omega_1 t)|$ and $|\sin(\omega_2 t)|$ correspond to absolute values of the sine values. Sin is the sine value of the number following the symbol. Floor function is the function that takes as input a real number and gives as output the greatest integer less than or equal to the real number.

In one embodiment the waveform of the electric field applied at the initial optical state of the device to drive the device to the final optical state is a superposition of a carrier waveform and a modulator waveform, wherein the modulator waveform is reduced over time from an initial amplitude (at the application of the superposed waveform to the device) to a final amplitude (at the termination of the application of the superposed waveform to the device), wherein the final amplitude is zero volts. In another embodiment the final amplitude is greater than zero volts. The final amplitude value of the modulator waveform can be from about 0.01 V to about 4 V, or from about 0.1 V to about 3 V.

In one embodiment, the waveform of the electric field applied at the initial optical state of the device to drive the final optical state is a superposition of a carrier waveform and a modulator waveform, wherein the modulator waveform is reduced over time from an initial amplitude (at the application of the superposed waveform to the device) to a final amplitude (at the termination of the application of the superposed waveform to the device) in a non-linear manner. The non-linear reduction of the amplitude of the modulator waveform over time can be selected to be described by any non-linear mathematical equation (amplitude versus time) such as an exponential function, power law, or any other expression. As with the linear manner, the reduction can be performed by a stepwise manner and the final amplitude of the modulator waveform (at the completion of the application of the amplitude to the device) can be zero volts or a value that is greater than zero volts. The final amplitude value of the modulator waveform can be from about 0.01 V to about 4 V, or from about 0.1 V to about 3 V.

The amplitude $V_1$ of the carrier portion of the waveform has a value of from about 30 V to about 180 V, and the frequency $\omega_1$ of the carrier waveform has a value of from about 50 Hz to about 1000 Hz. The initial amplitude $V_2$ of the modulator portion of the waveform has a value of from about 3 V to about 60 V, and the frequency $\omega_2$ of the modulator waveform has a value of from about 0.1 Hz to about 10 Hz. The amplitude $V_1$ of the carrier portion of the waveform may have a value of from about 50 V to about 150 V, or from about 90 V to about 140 V and the frequency $\omega_1$ of the carrier waveform may have a value of from about 60 Hz to about 500 Hz or form 70 Hz to 120 Hz. The initial amplitude $V_2$ of the modulator waveform can be selected from about 5 V to about 50 V, or from about 10 V to about 30 V. The frequency $\omega_2$ of the modulator waveform can be selected from about 0.5 Hz to about 5 Hz, or from about 0.8 Hz to about 2 Hz. The amplitude $V_1$ of the carrier portion of the waveform is higher than the initial amplitude $V_2$ of the modulator portion of the waveform. The frequency $\omega_1$ of the carrier waveform is higher than the frequency $\omega_2$ of the modulator waveform. The total driving time ($t_{total}$) in which the waveform is applied to the variable light transmission device to switch from the initial optical state to the final optical state may be from about 1 s to about 100 s, from about 5 s to about 90 s, from about 10 s to about 60 s, or from about 20 s to about 40 s.

Generally, the frequencies mentioned here have lower values than typically used for such switching to the open state. This contributes to less energy consumption for the device, which offers reduced operation costs and/or higher autonomy. In addition, the superposition of the carrier and modulator waveforms benefit from a shorter time required for the switch, and a higher transmission of the lower haze observed at the open state, compared to other typically used waveforms.

As mentioned above, the waveform applied at an initial optical state of the variable light transmission device to drive the final optical state of the device, is a superposition of two waveforms, a carrier waveform and a modulator waveform. The amplitude of the carrier waveform $V_1$ and the frequency of the carrier waveform $\omega_1$ are larger than the corresponding initial amplitude and the frequency of the modulator waveform $V_2$ and $\omega_2$ respectively. The purpose of the application of the carrier square waveform portion is to shutter the pigment particles, that is, to aggregate them in the equatorial space of a capsule or a droplet of the electrophoretic fluid. The modulator waveform portion has lower amplitude and frequency than the amplitude and frequency of the carrier wave form. Thus, while not wanting to be bound to theory, it is believed that the utilization of a carrier waveform in addition to the modulator waveform may improve shuttering by facilitating ICEO motion of the particles and aggregate them in the equatorial space of a capsule or a droplet of the electrophoretic fluid. The methods according to various embodiments of the present invention may contribute to the remixing of the liquid of the capsule or the droplet, where the electrically chargeable particles reside, and enable any such particles that have been trapped in the center of the capsules or liquid droplets to move to equatorial positions. Such particles trapped in the center of the center of the cavity may reduce the light transmission and increase haze of the film in the open state. Thus, the application of a waveform that includes a modulator waveform contributes to an open state having higher transmission and lower haze.

The amplitude of the modulator waveform is reduced from the initial amplitude value $V_2$ at the time of the application of the waveform to the initial optical state of the device to a smaller final amplitude value of the modulator waveform at the time the application of the waveform is completed. The reduction of the amplitude of the modulator waveform can be selected to be linear with time or it can be exponential with time, or it can be expressed via any other mathematical equation as a function of time. In general, this reduction of the amplitude of the modulator waveform can be performed in more than 2, or more than 5 or more than 10 or more than 50 or more than 100 or more than 200 steps. The waveform that is applied to the variable light transmission device can be square, sinusoidal, trigonal, sawtooth waveform or it can be any other waveform type.

It will be apparent to those skilled in the art that numerous changes and modifications can be made in the specific embodiments of the present invention described above without departing from the scope of the invention. Accordingly, the whole of the foregoing description is to be construed in an illustrative and not in a limitative sense. All of the foregoing published patents, publications, and pending applications are incorporated by reference herein in their entireties.

EXAMPLES

Examples are now given, though by way of illustration only, to show details of variable light transmission devices made and evaluated according to various embodiments of the present invention.

Preparation—Variable Light Transmission Device.

A nonaqueous internal phase was prepared by combining polyisobutylene succinimide (OLOA® 11000, supplied by Chevron), 1-limonene, Cargille® 5040 immersion fluid, Mogul L carbon black (supplied by Cabot Corp.), polystyrene, and 2-hexyldecanoic acid. The internal phase thus prepared was then encapsulated by adding the mixture to an aqueous solution of porcine gelatin/acacia followed by addition of Emperor 2000 carbon black with 5 wt % Kolliphor P188. After heating, mixing, and pH adjustment, the resulting capsules were cooled and then sorted to create a mixture of capsules with a size distribution between 20 and 60 μm diameter, with a mean diameter of 30-50 μm.

The capsule slurry was centrifuged and then mixed with an aqueous binder of fish gelatin (Norland HiPure Liquid Gelatin) at a ratio of 1 part by weight binder to 7 parts by weight of capsules. A solution of colorant (10 wt % Emperor 2000 carbon black with 5 wt % Kolliphor P188 (Sigma-Aldrich 15759), was prepared in water and then added to the aqueous binder at a ratio of 1 part colorant to 49 parts binder. The resultant mixture of binder and encapsulated internal phase was bar coated on to a 125 μm thick indium-tin oxide coated polyester film. The coated film was dried to produce an electrophoretic medium approximately 23 μm thick containing essentially a single layer of capsules.

The capsule-coated surfaces of the coated films were then overcoated with a urethane acrylate based adhesive. As the adhesive layer was added, a screen-printed sheet of 125 um thick indium-tin oxide coated polyester film was applied. The resulting assemblies were then cured by exposure to UV light from a CSun UV lamp. Using the techniques above, window pixels (i.e., top and bottom light-transmissive electrodes) were built.

Testing—Variable Light Transmission Device

The device constructed as described above was driven with waveforms of the form described above following a sequence that was designed to switch the device from the closed state to the open state. This waveform consisted of a superposition of a carrier waveform and a modulator waveform. The carrier waveform had an amplitude of 120 V and frequency of 86 Hz, whereas the modulator waveform had an amplitude of 21 V and frequency of 1 Hz. The waveform was applied to the device for 30 seconds. In Example 1, the amplitude of the modulator waveform was reduced from 21 V to zero in 5 steps over the applied period of 30 s. The applied modulator amplitude over time is provided in FIG. 1. In Example 2, the amplitude of the modulator waveform was decreased from 21V to zero V in 30 steps over the applied period of 30 s. In both examples 1 and 2, the reduction of the amplitude of the modulator waveform was performed in a linear manner. That is, in Example 1, the initial amplitude of the modulator waveform (21 V) was sequentially reduced 5 times by 4.2 V (21/5) each time every 6 s (30/5). In Example 2, the initial amplitude of the modulator waveform (21 V) was sequentially reduced 30 times by 0.70 V (21/30) each time every 1 s (30/30). On the contrary, in comparative Example A, the modulator waveform was constant for the applied period of 30 s at 21 V. After the application of the waveform, each sample was placed in front of a calibrated light source with an integrated sphere detector on the opposite side of the device. The % Total Transmission of light through the device (light transmission intensity as the percent of the intensity of the incident light) was determined. Percent haze was also determined, which is defined as the percentage of diffuse transmitted light, that is, light that is scattered as it is transmitted, compared to total transmitted light, from a normal, collimated source with an azimuthal angle of greater than 2.5°. Percent haze was determined via a calibrated chopping wheel. Table 1 below shows the results obtained from the above-mentioned evaluation of the three waveform examples.

TABLE 1

|  | Comparative Ex. A | Ex. 1 | Ex. 3 |
| --- | --- | --- | --- |
| Amplitude of the carrier waveform ($V_1$) Volts | 120 | 120 | 120 |
| Frequency of the carrier waveform ($\omega_1$) in Hz | 86 | 86 | 86 |
| Initial amplitude of the modulator waveform | 21 | 21 | 21 |

TABLE 1-continued

|  | Comparative Ex. A | Ex. 1 | Ex. 3 |
|---|---|---|---|
| ($V_2$) in Volts Frequency of the modulator waveform ($\omega_2$) in Hz | 1 | 1 | 1 |
| Total Time applied ($t_{total}$) in s | 30 | 30 | 30 |
| Amplitude of the modulator waveform change over time | No reduction over time; Constant amplitude is applied | The amplitude is reduced over time from initial 21 V to final 0 V in 5 steps | The amplitude is reduced over time from initial 21 V to final 0 V in 30 steps |
| % Total Transmittance of final state | 24 | 40 | 39 |
| % Haze of final state | 20 | 17 | 18 |

Table 1 indicates that the % Total Transmittance was increased and the percent haze was decreased when the amplitude of the modulator waveform was decreased over the time of the application of the waveform to the variable light transmission device to achieve the open state of the device. The comparative Example A, wherein a constant amplitude modulator waveform was applied, showed a lower % Total Transmittance and higher percent haze compared to Ex. 1 and Ex. 2.

Although the present invention has been described with respect to square wave AC waveforms, it will be clear to one of skill in the art that other periodic forms (for example, sine waves, triangular waves, and the like) would be substituted without departing from the spirit of the invention.

The invention claimed is:

1. A method of operating a variable light transmission device, the method comprising:
providing the variable light transmission device comprising an electrophoretic medium layer comprising a plurality of discrete droplets, each droplet of the electrophoretic medium comprising charged particles in a suspending fluid, each droplet being present within a capsule or within a microcell, each droplet being surrounded by walls, the walls including lateral walls, wherein the electrophoretic medium layer is disposed between two electrodes;
applying an electric field across the electrophoretic medium layer via application of a first driving waveform that causes movement of the charged particles to the lateral walls of the droplets, resulting in aggregation of the charged particles to the lateral walls of the droplets, the variable light transmission device switching from an initial optical state to a final optical state, wherein the first driving waveform is applied from a start until a completion of the application of the first driving waveform, wherein the time from the start until the completion of the application of the first driving waveform is a total driving time of the first driving waveform, wherein the final optical state has higher percent light transmission than the initial optical state, wherein the first driving waveform is a superposition of a carrier waveform and a modulator waveform, wherein the carrier waveform has amplitude $V_1$ and frequency $\omega_1$, wherein the $V_1$ is from about 50 V to about 150 V, wherein $\omega_1$ is from about 50 Hz to about 1000 Hz, wherein the modulator waveform has initial amplitude $V_2$ and frequency $\omega_2$, wherein $V_2$ is from about 5 V to about 50 V, wherein $\omega_2$ is form about 0.1 Hz to about 10 Hz, wherein $V_1$ is greater than $V_2$ and $\omega_1$ is greater than $\omega_2$, wherein the amplitude of the modulator waveform is variable and is reduced from an initial amplitude value at the start of the application of the first driving waveform to the variable light transmission device to a final amplitude value at the completion of the application of the first driving waveform to the variable light transmission device, wherein the reduction of the amplitude value of the modulator waveform from the initial amplitude value to the final amplitude value is performed in 5 or more sequential steps, the amplitude value of the modulator waveform at any one step of the 5 or more sequential steps being less than the amplitude value of the modulator waveform at all steps that took place prior to said step during the application of the first driving waveform, and wherein the % Total Transmittance of the final optical state of the variable light transmission device is from about 30% to about 95%.

2. The method of operating a variable light transmission device according to claim 1, wherein the final amplitude value of the modulator waveform is zero.

3. The method of operating a variable light transmission device according to claim 1, wherein the final amplitude value of the modulator waveform is from 0.1 V to 3 V.

4. The method of operating a variable light transmission device according to claim 1, wherein the first driving waveform is selected from the group consisting of square, sinusoidal, trigonal, and sawtooth waveforms.

5. The method of operating a variable light transmission device according to claim 1, wherein the first driving waveform is represented by Equation 1, Equation 2, or Equation 3, $$V(t) = V_1 \frac{\sin(\omega_1 t)}{|\sin(\omega_1 t)|} + V_2 \frac{t_{total} - t}{t_{total}} \frac{\sin(\omega_2 t)}{|\sin(\omega_2 t)|} \qquad \text{Equation 1}$$

$$V(t) = V_1 [\sin(\omega_1 t)] + V_2 \frac{t_{total} - t}{t_{total}} \sin(\omega_2 t) \qquad \text{Equation 2}$$

$$V(t) = V_1 \frac{2\omega_1}{\pi} \sin^{-1}(\sin(2\pi t)) + V_2 \frac{t_{total} - t}{t_{total}} \frac{2\omega_2}{\pi} \sin^{-1}(\sin(2\pi t)), \qquad \text{Equation 3}$$

wherein $t_{total}$ is the total driving time of the application of the first driving waveform to switch the variable light transmission device from the initial optical state to the final optical state, and wherein t is the time passed from the initial application of the first driving waveform.

6. The method of operating a variable light transmission device according to claim 1, wherein the modulator waveform has initial amplitude $V_2$ of from about 10 V to about 30 V.

7. The method of operating a variable light transmission device according to claim 1, wherein the charged particles of the electrophoretic medium layer of the variable light transmission device comprise titanium dioxide.

8. The method of operating a variable light transmission device according to claim 1, wherein the total driving time of the application of the first driving waveform is from about 1 s to about 100 s.

9. The method of operating a variable light transmission device according to claim 1, wherein the total driving time from the start of the application of the first driving waveform to the completion of the application of the first driving waveform to the variable light transmission device is from about 5 s to about 90 s.

10. The method of operating a variable light transmission device according to claim 1, wherein the reduction of amplitude value of the modulator waveform from the initial amplitude value to the final amplitude value is performed in 10 or more sequential steps.

11. The method of operating a variable light transmission device according to claim 1, wherein the reduction of amplitude value of the modulator waveform from the initial amplitude value to the final amplitude value is performed in 100 or more sequential steps.

12. The method of operating a variable light transmission device according to claim 1, wherein a % haze of the final optical state of the variable light transmission device is from about 5% to about 20%.

* * * * *